United States Patent
Mar et al.

[11] Patent Number: 5,984,358
[45] Date of Patent: Nov. 16, 1999

[54] SEAT BELT LATCHPLATE

[75] Inventors: William Mar, Clinton Township; Fred Daris, Clarkston; Gary Bityk, Royal Oak; Randall J. Ryszewski, Grosse Pointe Woods, all of Mich.

[73] Assignee: Chrysler Corporation, Auburn Hills, Mich.

[21] Appl. No.: 08/976,911

[22] Filed: Nov. 24, 1997

[51] Int. Cl.⁶ .................................................. B60R 22/00
[52] U.S. Cl. ........................................ 280/808; 24/163 R
[58] Field of Search ................................ 280/801.1, 808; 297/483, 468; 24/265 BC, 588, 163 R

[56] References Cited

U.S. PATENT DOCUMENTS

| 4,006,904 | 2/1977 | Weman et al. | 24/163 R |
| 4,023,826 | 5/1977 | Kokubo et al. | 24/163 R |
| 4,102,020 | 7/1978 | Lindblad | 24/164 |
| 5,257,820 | 11/1993 | Kosugi | 280/808 |

*Primary Examiner*—Paul N. Dickson
*Attorney, Agent, or Firm*—James R. Yee

[57] ABSTRACT

An improved seat belt latchplate having a plurality or ribs in a web-guiding slot for resisting, roping and twisting of a seat belt webbing.

14 Claims, 2 Drawing Sheets

SEAT BELT LATCHPLATE

BACKGROUND OF THE INVENTION

1. Technical Field

The present invention relates to a seat belt latchplate for resisting roping and twisting of seat belt webbing.

2. Discussion

Modern seat belt systems having adjustable latchplates generally employ one of two different types of latchplates. In one type of latchplate, web-guiding slots for receiving a seat belt webbing are defined parallel to one another and possibly in the same plane so that the webbing, when threaded therethrough, frictionally holds the latchplate in place at a desired point along the webbing.

Another type of device, a "free-falling latchplate," has one or more web-guiding slots through which the webbing is threaded, so the latchplate can slide generally with relatively lower frictional resistance as compared with the aforenoted latchplate. A button or other suitable member is commonly attached to the webbing to stop the latchplate from moving past a certain point along the webbing.

It has been observed that occasional roping or twisting of the webbing will occur within a web-guiding slot. FIGS. 2 and 4 illustrate an example of such a phenomena in an exemplary prior art latchplate. In FIGS. 2 and 4, a seat belt latchplate A includes a first portion B having a tongue C, and a second portion D having a first web-guiding slot E and a second web-guiding slot F. A webbing G (shown twisted) is threaded through the first and second web-guiding slots E and F.

The employment of a single projection in a wall defining a web-guiding slot, opposed by two projections, has been employed in the art.

SUMMARY OF THE INVENTION

The present invention provides a seat belt latchplate for improving resistance of a seat belt webbing to roping or twisting. While the present invention constitutes an improvement for latchplates of any particular type, without limitation, it is particularly attractive for latch plates of the free falling type.

In one embodiment, a seat belt latch plate includes a first portion having a tongue, with an aperture therethrough, for insertion into a buckle wherein a latch lockingly engages the latchplate through the aperture. The latchplate has a second portion attached to the first portion with at least one web-guiding slot defined in it. The structure defining such web-guiding slot is characterized by an interior wall having a plurality of ribs projecting from one side of the wall, and an opposing side of the wall having a plurality of ribs projecting therefrom in a direction generally toward the ribs from the first side of the wall. Each of the ribs has a rib tip and a rib root. The rib root is adjacent to grooves recessed in the sides of the wall. The opposing ribs are spaced a predetermined distance sufficient to enable a seat belt webbing to be threaded therethrough and lay generally flat. The ribs and the grooves cooperate to help guide the edges of the seat belt webbing for relatively good resistance to twisting and roping of the webbing.

BRIEF DESCRIPTION OF THE DRAWINGS

Other features and advantages of the invention will be evident from the following detailed description of the preferred embodiment of the invention and the accompany drawings wherein.

DETAILED DESCRIPTION OF THE PREFERRED EMBODIMENT

Figure 1:
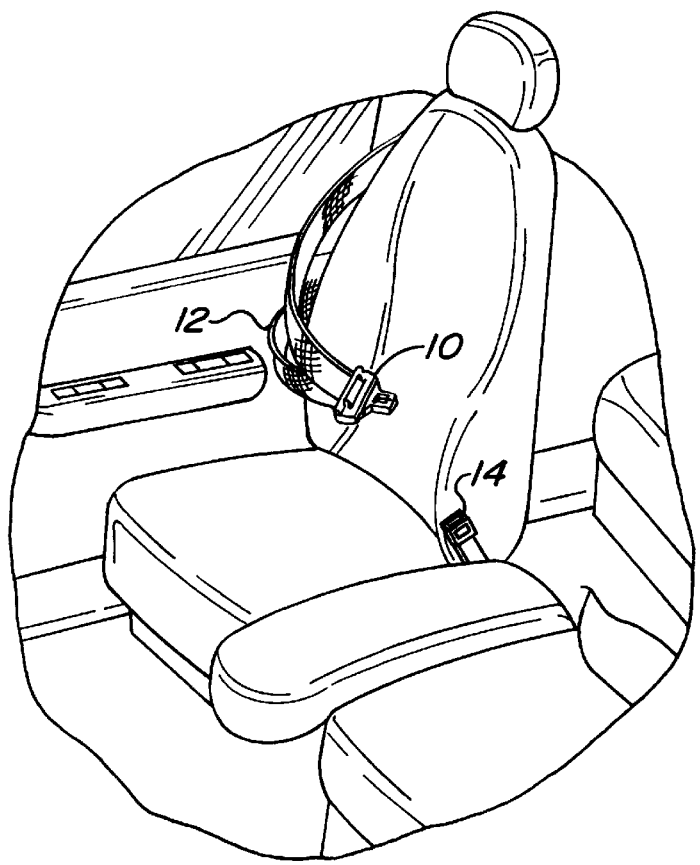
FIG. 1 is a perspective plan view of a vehicle seat belt system.
Figure 2:
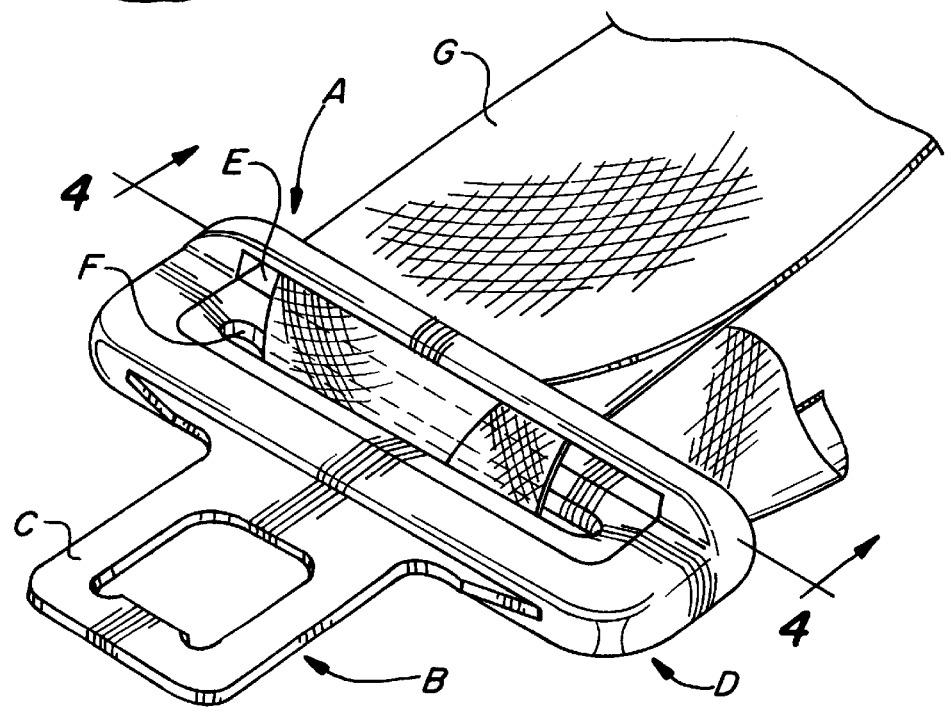
FIG. 2 is a perspective plan view of a prior art seat belt latchplate illustrating twisting of the webbing in the latchplate guide slots.
Figure 3:
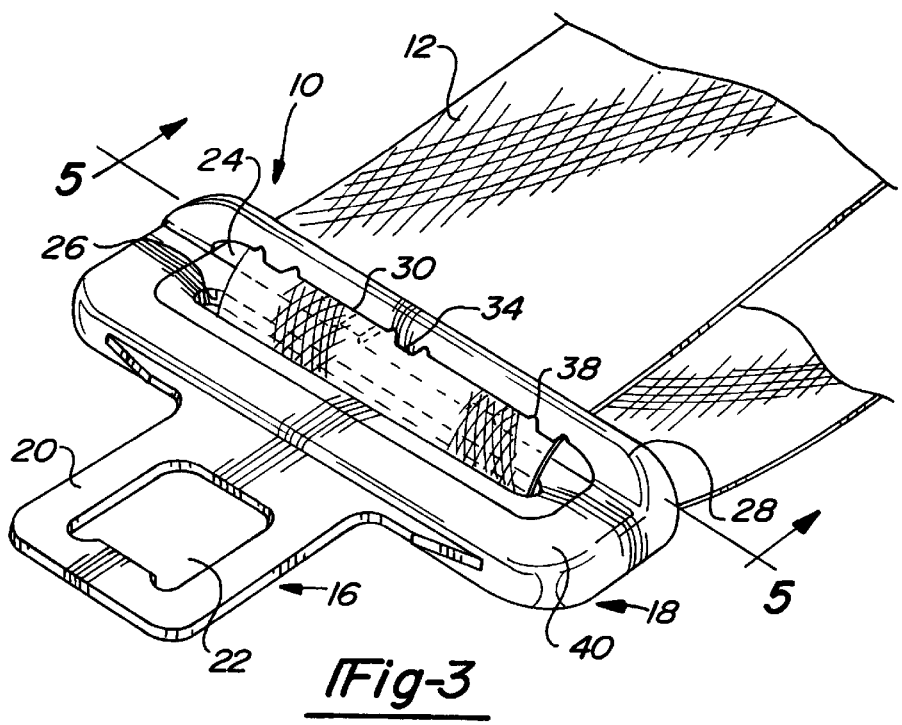
FIG. 3 is a perspective plan view of a latchplate in accordance with the present invention.
Figure 4:
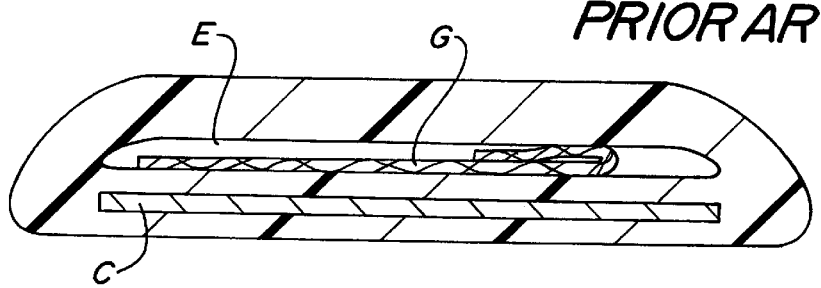
FIG. 4 is a section along lines 4—4 of FIG. 2.

FIG. 1 illustrates an example (without limitation) of a seat belt system having a latchplate 10, a seat belt webbing 12 threaded through the latchplate 10 and a buckle 14. The seat belt webbing 12 is attached at one end to a suitable retractor (not shown), and may be anchored to the vehicle at another end (not shown). With specific reference to FIGS. 3 and 5, the latchplate 10 includes a first portion 16 for engaging (as known in the art) in locking relationship with a seat belt buckle, and a second portion 18 adjoining the first portion 16 for receiving the seat belt webbing 12 (omitted for illustration purposes from FIG. 5). The first portion 16 includes a tongue 20 having an aperture 22 defined therein for engaging in locking relationship with a latch (not shown) in the seat belt buckle 14. The second portion 18 has at least one web-guiding slot 24 for receiving the webbing 12. For an embodiment having a first slot 24 and a second slot 26, such as shown in FIG. 3, the slots are defined generally parallel to one another, and in one aspect, the slots are defined each in a plane different from the other (see, for example, FIG. 3).

Figure 5:
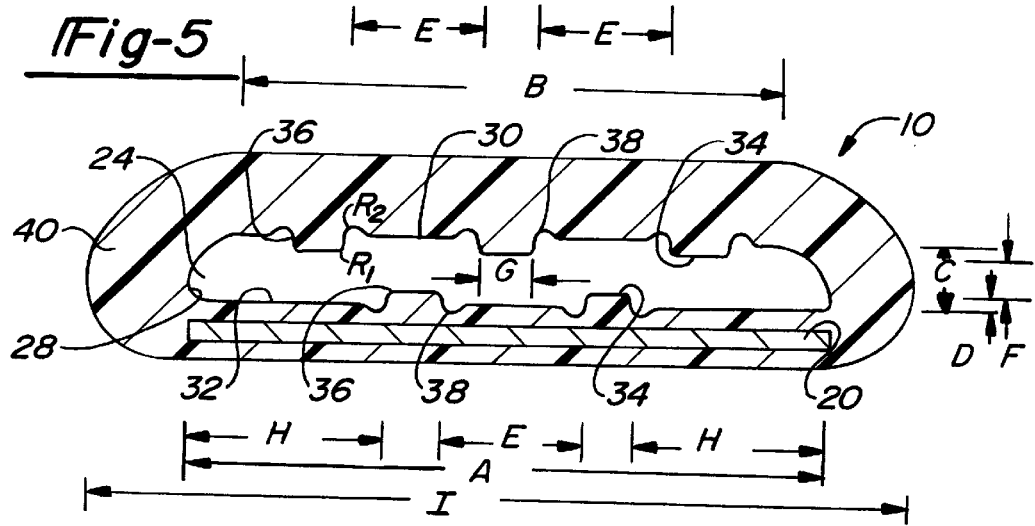
FIG. 5 is a section along lines 5—5 of FIG. 3 with webbing omitted.

The structure in the second portion 18 defining at least one of the web-guiding slots is shown more particularly in FIG. 5 (webbing omitted for illustration purposes). While one of the two web-guiding slots (e.g., second slot 26 in FIG. 3) may have a smooth and continuous interior wall defining the slot, preferably the first web-guiding slot 24 is defined by an interior wall 28, shown in the example of FIG. 5 as having a generally trapezoidal configuration. The wall 28 has a first side 30 and second side 32 opposing the first side 30 (The designation of "first" and "second" sides is not intended as restricting the location of such sides nor as limiting the interchangesability of the respective side structures). At least one and preferably both of the first and second sides 30 and 32 have a plurality of inwardly projecting ribs (two, but not all, of the ribs are labeled in FIG. 5 with reference numeral 34) having generally smooth rounded corners 36 (labeled in FIG. 5 on two of the ribs). Adjacent the roots of the ribs are generally smooth rounded grooves 38. In one embodiment, such as shown in FIGS. 3 and 5, one side (e.g., the first side 30) has three ribs. The other side (e.g., second side 32) has two ribs. The ribs on the first side are disposed opposite the ribs on the second side, but in one embodiment (e.g., FIGS. 3 and 5), they are intermittently spaced and are not directly opposite one another.

In one embodiment, a webbing having a thickness of about one mm and a width of about 47 to about 50 mm is employed. Referring to FIG. 5, for such an embodiment, by way of illustration (without limitation), the second side 32 of the wall 28 has a dimension A of at least about 63 to about 64 mm (and more preferably about 63.5 mm). The first side 30 of the wall 28 will have a dimension B of at least about 56 mm. The first side 30 and second side 32 are spaced apart by a dimension C of about 2.0 to about 2.7 mm (and more preferably about 2.5 mm). The rib height D for all ribs is about 0.6 mm, and the ribs on each of the respective sides are spaced a dimension E of about 20 mm. The distance F between planes defined by opposing rib tips is about 1.1 to about 1.5 mm (and more preferably about 1.3 mm). Each rib has a width G of about 4 to about 6 mm (and more preferably about 4 mm). On the first side 30 of the wall 28, the distance H from the respective ends of the wall to the rib is about 18 mm. The overall width I of the section of the latchplate shown is about 83.5 mm. The corners of the ribs have a radius of curvature $R_1$, of about 0.5 mm and the grooves have a radius of curvature $R_2$ of about 1.0 mm. Of course, other dimensions may be suitably employed.

Preferably the seat belt latchplate of the present invention is made from a suitable metal, such as, without limitation, a stainless or plated steel. Preferably the metallic material is insert molded to define a molded plastic (e.g., without limitation, nylon) portion 40, with a web-guiding slot therein, such as is shown in FIG. 5.

In operation, a user can adjust the latchplate along a length of the webbing by sliding the webbing through the web-guiding slots. The tendency to rope or twist is resisted by structure and relative spacing of the ribs 34 and grooves 38 on the first and second sides 30 and 32 of the wall 28 defining one of the web-guiding slots. Without intending to be bound by theory, in the event of roping or twisting initiating, the ribs and adjoining grooves help provide a surface against which the edges of the seat belt webbing can be directed to return the webbing to its normal flat configuration.

Reasonable modifications and variations of the above-described illustrative embodiment of the invention are possible without departing from the spirit and scope of the invention, which is defined in the appended claims.

We claim:

1. A seat belt latchplate comprising:
   a first portion having a tongue with an aperture defined therein for engaging a latch in a seat belt buckle; and
   a second portion having at least one web-guiding slot defined therein for receiving a seat belt webbing, said structure defining said web-guiding slot including an interior wall having a first side and a second side in generally opposing relation to one another;
   said first side having a plurality of ribs each having a root and a tip projecting from said first side generally toward said second side; and,
   said second side has a plurality of ribs each having a root and a tip projecting from said second side generally toward said first side, wherein said ribs on said first side number at least one greater than the number of ribs on said second side.

2. The seat belt latchplate according to claim 1, wherein said ribs on said first side are substantially equally spaced relative to each other and said ribs on said second side are substantially equally spaced relative to said ribs on said first side.

3. A seat belt latchplate comprising:
   a first portion having a tongue with an aperture defined therein for engaging a latch in a seat belt buckle; and
   a second portion having at least one web-guiding slot defined therein for receiving a seat belt webbing, said structure defining said web-guiding slot including an interior wall having a first side and a second side in generally opposing relation to one another;
   said first side having a plurality of ribs each having a root and a tip projecting from said first side generally toward said second side;
   said second side has a plurality of ribs each having a root and a tip projecting from said second side generally toward said first side; and,
   grooves defined adjacent to said rib roots in at least one of said first and second sides.

4. A seat belt latchplate comprising:
   a first portion having a tongue with an aperture defined therein for engaging a latch in a seat belt buckle; and
   a second portion having at least one web-guiding slot defined therein for receiving a seat belt webbing, said structure defining said web-guiding slot including an interior wall having a first side and a second side in generally opposing relation to one another;
   said first side having a plurality of ribs each having a root and a tip projecting from said first side generally toward said second side;
   said second side has a plurality of ribs each having a root and a tip projecting from said second side generally toward said first side;
   and wherein said first side has at least three ribs and said second side has at least two ribs.

5. A seat belt system, comprising:
   (a) a seat belt webbing attached at one end to an automobile;
   (b) a seat belt retractor connected to said seat belt webbing at another end of said webbing; and
   (c) a latchplate adjustably located on said webbing, said latchplate including:
   a first portion having a tongue with an aperture defined therein for engaging a latch in a seat belt buckle and;
   a second portion having at least one web-guiding slot defined therein for receiving a seat belt webbing, said structure defining said web-guiding slot including an interior wall having a first side and a second side in generally opposing relation to one another;
   said first side having a plurality of ribs, each having a tip and a root, protecting from said first side generally toward said second side and said second side having a plurality of ribs, each having a rib tip and a root, projecting from said second side generally toward said first side; and,
   wherein said ribs on said first side number at least one greater than the number of ribs on said second side.

6. The seat belt system according to claim 5, wherein said ribs on said first side are substantially equally spaced relative to each other and said ribs on said second side are substantially equally spaced relative to said ribs on said first side.

7. A seat belt system, comprising:
   (a) a seat belt webbing attached at one end to an automobile;
   (b) a seat belt retractor connected to said seat belt webbing at another end of said webbing; and
   (c) a latchplate adjustably located on said webbing, said latchplate including:
   a first portion having a tongue with an aperture defined therein for engaging a latch in a seat belt buckle and;
   a second portion having at least one web-guiding slot defined therein for receiving a seat belt webbing, said structure defining said web-guiding slot including an interior wall having a first side and a second side in generally opposing relation to one another;
   said first side having a plurality of ribs, each having a tip and a root, projecting from said first side generally toward said second side and said second side having a plurality of ribs, each having a rib tip and a root, projecting from said second side generally toward said first side; and, grooves defined adjacent to said rib roots in at least one of said first and second sides.

8. A seat belt system, comprising:

(a) a seat belt webbing attached at one end to an automobile;

(b) a seat belt retractor connected to said seat belt webbing at another end of said webbing; and (c) a latchplate adjustably located on said webbing, said latchplate including:

a first portion having a tongue with an aperture defined therein for engaging a latch in a seat belt buckle and;

a second portion having at least one web-guiding slot defined therein for receiving a seat belt webbing, said structure defining said web-guiding slot including an interior wall having a first side and a second side in generally opposing relation to one another; and, said first side having a plurality of ribs, each having a tip and a root, projecting from said first side generally toward said second side and said second side having a plurality of ribs, each having a rib tip and a root, projecting from said second side generally toward said first side; wherein said first side has at least three ribs and said second side has at least two ribs.

9. A seat belt latchplate, comprising:

a first portion having a tongue with an aperture defined therein for engaging a latch in a seat belt buckle; and a second portion having a first web-guiding slot and a second web-guiding slot defined therein, said first and second web-guiding slots being each defined generally parallel to the other, said first and second web-guiding slots being each defined generally in a different plane relative to the other;

said structure defining said first web-guiding slot including an interior wall having a first side and a second side, in generally opposing relation to one another;

said first side having at least three ribs projecting from said first side and said second side having at least two ribs projecting from said second side opposite said ribs from said first side and spaced from said ribs in said first side, each of said ribs from said first side having a rib tip and a rib root and having a groove defined in said first side adjacent said rib root; and each of said ribs from said second side having a rib tip and a rib root and having a groove defined in said second side adjacent said rib root.

10. The seat belt latchplate according to claim 9, wherein said ribs on said first side number at least one greater than the number of ribs on said second side.

11. The seat belt latchplate according to claim 10, wherein said ribs on said first side are substantially equally spaced relative to each other and said ribs on said second side are substantially equally spaced relative to said ribs on said first side.

12. The seat belt latchplate according to claim 9, wherein the distance between the plane defined by said rib tips of said ribs from said first side and the plane defined by said rib tips of said ribs from said second side does not exceed approximately 150% the thickness of any seat belt webbing that is threaded through said first web-guiding slot.

13. The seat belt latchplate according to claim 9, wherein the structure defining said grooves has a radius of curvature, such that the ratio of said radius of curvature to the width of an adjacent rib less than about 1:4 to about 1:6.

14. The seat belt latchplate according to claim 9, wherein said ribs from said second side oppose the spacing defining between the ribs of said first side.

* * * * *